March 13, 1928. 1,662,372

A. D. WARD

SAW GUARD

Filed April 26, 1926

INVENTOR:
A. D. Ward,
BY J. W. Sheeley
ATTORNEY.

Patented Mar. 13, 1928.

1,662,372

UNITED STATES PATENT OFFICE.

ABRAHAM D. WARD, OF LOS ANGELES, CALIFORNIA.

SAW GUARD.

Application filed April 26, 1926. Serial No. 104,681.

The present invention relates to improvements in power saws, and pertains more particularly to guards for underslung saws and the like.

It will be understood in the consideration of this invention that underslung saws include a traveling saw which moves through a slot in a table while the work is held stationary upon such table. The saw is usually actuated by a foot lever or pedal which moves the saw through the work toward the operator. Such saws, like any other exposed power saw, is quite dangerous and heretofore there has not been any practical means for guarding such a saw.

It is therefore the principal object of this invention to provide an efficient guard for underslung saws which will prevent the workman's hands from coming in contact with the saw and which will remove all foreign objects out of the path of such saw as same moves forwardly.

Another object of the invention is to provide a saw guard of low cost and rigid construction which may be readily applied to standard underslung saws and the like.

Still other objects and advantages of my invention will appear hereinafter.

I have illustrated my invention by the accompanying drawings in which I have shown one practical embodiment of the invention applied to a common type of underslung saw.

In the said drawings:—

Figure 1:
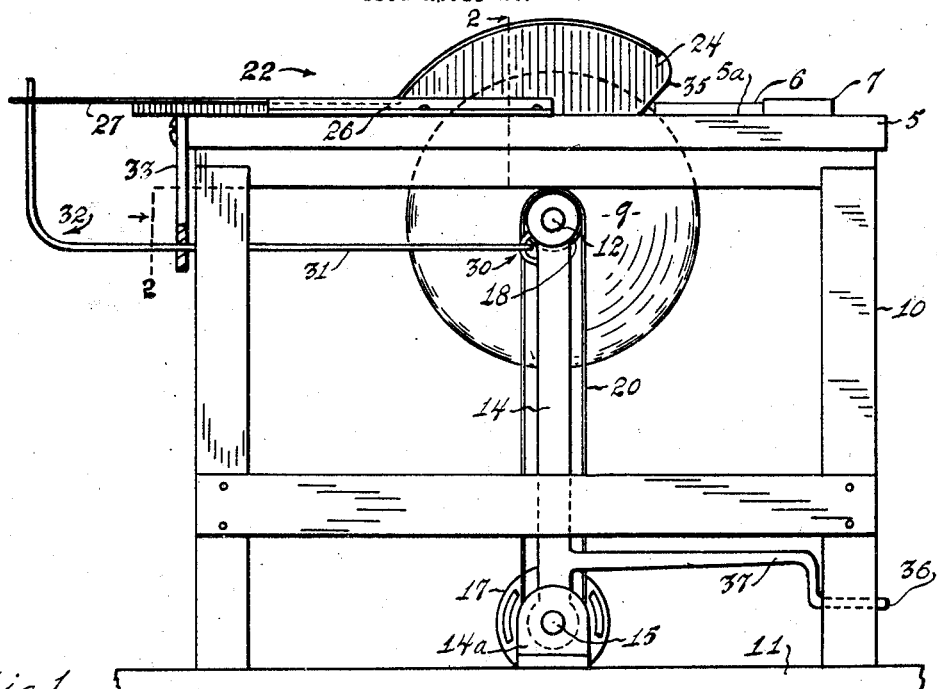
Figure 1 is a view in side elevation of such saw.
Figure 3:
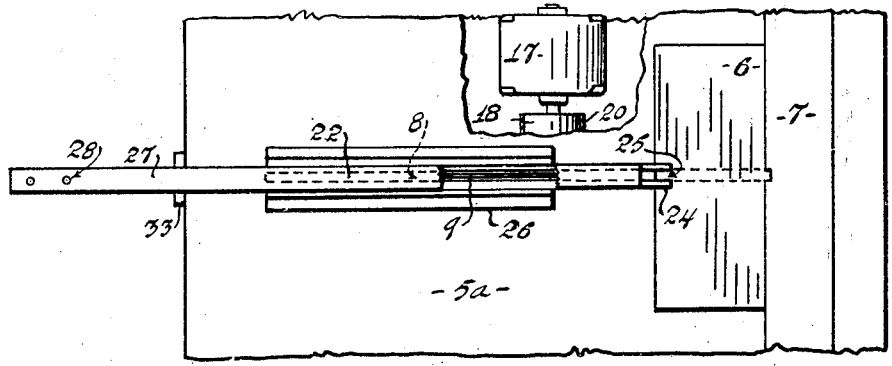
Figure 3 is a plan view of the saw showing parts removed to reveal underlying parts.
Figure 2:
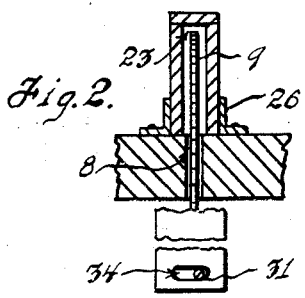
Figure 2 is a view in section on a line 2—2 of Fig. 1.

More specifically, 5 indicates the table of an underslung saw; the table having a smooth upper surface 5ª, on which the work 6 may be laid. A stop 7 holds the work against forward movement. The table is provided with the usual slot 8, through which the circular saw 9 projects above the surface of the table. The table is supported by legs 10 upon a base or floor 11. The saw is revolubly mounted as at 12 on a vertically disposed oscillating arm 14. Said arm is trunnioned in bearings 14ª supported by the base; a shaft 15 passing through said bearings and serving as a pivot for said arm. The saw is provided with a pulley driven by a motor 17. The motor is provided with a pulley 18 aligned with the shaft 15, so that as the upper end of the arm moves the distance from the motor pulley to the saw pulley is the same at all times. Thus the motor may drive the saw through a belt 20, regardless of the angle at which the arm 14 is inclined.

Such construction is common to underslung saws, and my invention is applicable to the described type of saw, as well as to numerous other types of underslung saws and similar machines. The essence of my invention, however, resides in the provision of a guard 22, which is arranged to cover the exposed portion of the saw.

The guard may be of any suitable material, such as wood, and is of inverted U cross section, providing a space 23, in which the upper portion of the saw is disposed. Said guard is provided with spaced forward extensions or ears 24 providing a space or opening 25, through which the operator may view the exposed cutting edge of the saw. On the upper surface of the table, I provide two spaced angle iron guides 26 for the guard; said guard being arranged to ride over the surface of the table while being guided. Said guides are disposed, one to each side of the slot.

The guard includes a rear extension or tail-piece 27, provided with a plurality of apertures 28. To the arm 14 there is pivotally attached, as at 30, a horizontal, rearwardly projecting rod 31, which, at the rear of the table, is bent, as at 32, and extends vertically upward into one of the apertures 28. Thus as the arm moves, the saw guard moves with it. The pivot connection 30 should allow universal movement, inasmuch as it is disposed to one side of the saw, while the guard to which it is attached, is aligned with the saw. The rod is slidable through a plate 33 carried by the table, and which is provided with a slot 34. Said slot is extended laterally to allow for angular movement of the rod along the horizontal plane which it travels.

The saw is operated by depressing the pedal and thereby causing the upper end of arm 14 to move toward the work, thus causing the saw to move forwardly through the slot in the table and through the piece of work which is disposed on the table over the slot. As the upper end of the arm 14 moves forwardly, carrying the saw forward, the rod, which is attached to said arm, drives the guard forwardly at the same speed as the saw and keeps the saw covered at all times. The forward lower edges of the guard are curved, as at 35, so that the guard may ride up over the work when it encounters same, thereby keeping the saw covered over when it is passing through the work.

The cutting portion of the saw is visible to the operator at all times, but it is impossible for the operator's hand, or any foreign objects to come in contact with the saw above the table. Should the operator's hand, or any foreign objects be in the path of the saw, they will be forced away from the saw by the advancing guard. The guard is of course readily attached to any saw of the type illustrated and may be immediately removed in case of inspection, repair, or renewal of the circular saw.

It will be apparent now that I have provided a simple and efficient safety means for underslung saws and the like, and while I have shown and described a specific embodiment of my invention, I do not limit myself to any specific construction or arrangement of parts, nor am I limited to any type of saw to which my invention is applicable, and I may apply my invention to any saw or machine to which it is applicable, and I may employ any construction or arrangement of parts coming within the scope of the appended claims without departing from the spirit of the invention.

I claim:—

1. In a machine of the class described, a table provided with a slot, a saw carrying member arranged to travel under said table, a saw carried by saw carrying member with a portion of said saw projecting through said slot and above said table, guides on said table: one to either side of and paralleling said slot, a guard slidable over the surface of said table between said guides; said guard of U shape cross section and inverted over the said portion of the saw, a tail piece to said guard projecting horizontally rearwardly of the table, a horizontal rod pivoted to said saw carrying member and projecting rearwardly of said table: said rod and said tail piece being connected to each other at a point rearwardly of said table.

2. The combination as in claim 1 and further including, means at the forward end of said guard for removing obstructions from the path of said saw while permitting the said portion of the saw to be visible from points forwardly of and above said table.

ABRAHAM D. WARD.